July 19, 1966 J. E. FITZGERALD, SR 3,261,150
GROUND OR FLOOR WORKING DEVICE
Filed July 27, 1964 3 Sheets-Sheet 3
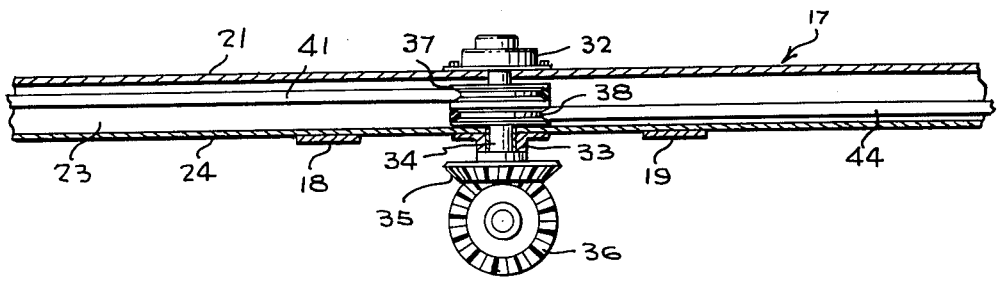
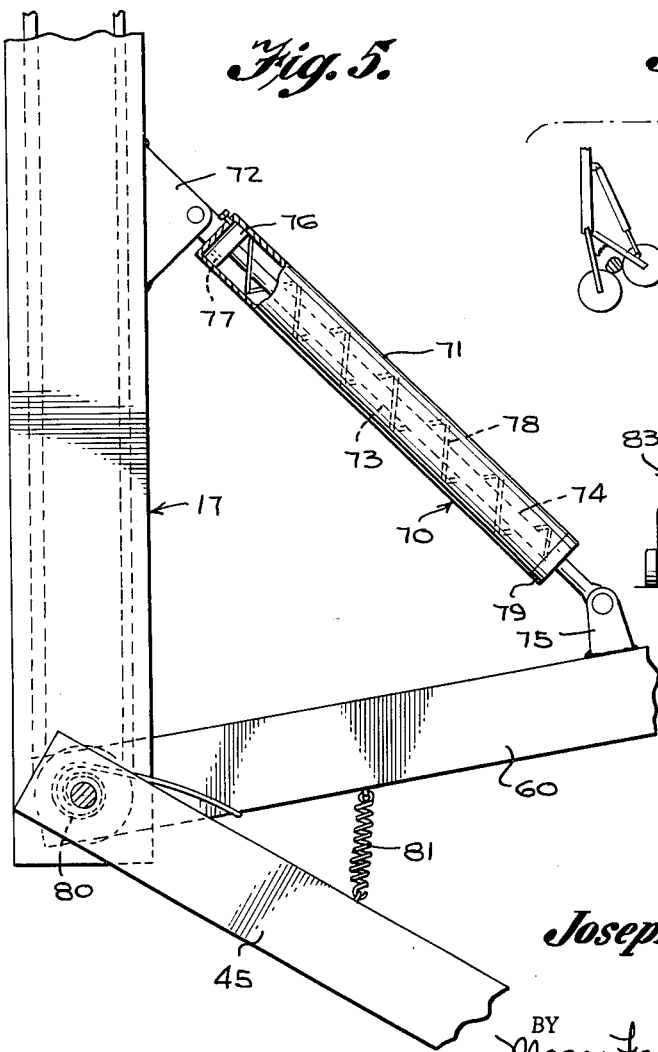
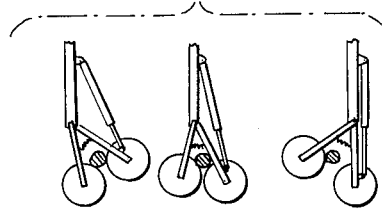
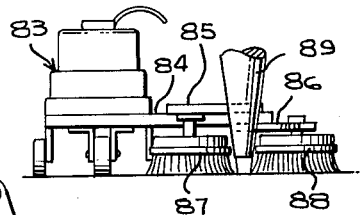
INVENTOR
Joseph E. Fitzgerald, Sr.
BY Mason, Fenwick & Lawrence
ATTORNEYS

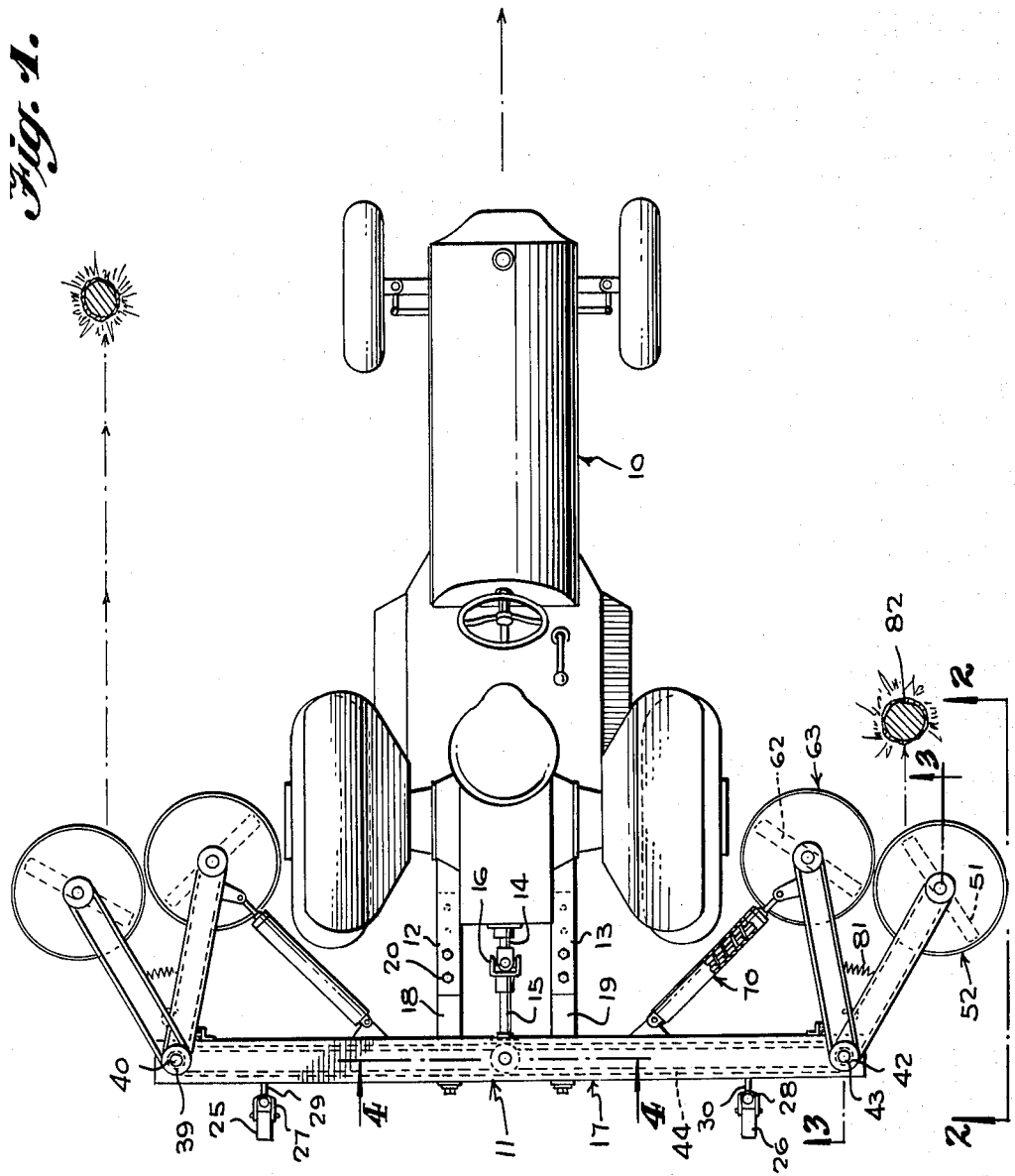

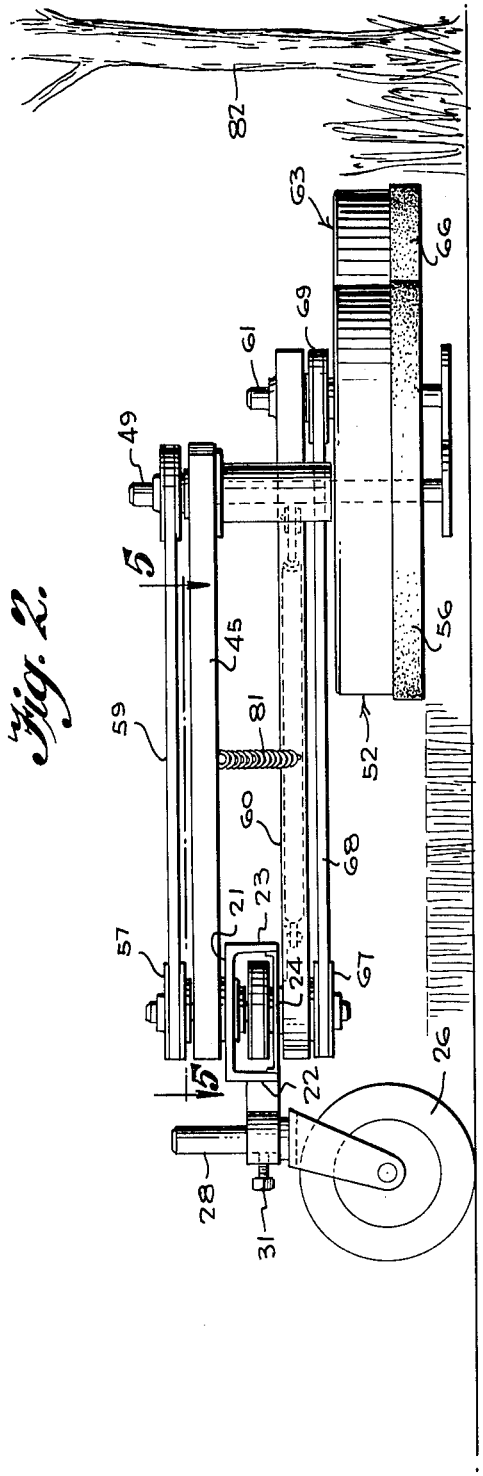

United States Patent Office 3,261,150
Patented July 19, 1966

3,261,150
GROUND OR FLOOR WORKING DEVICE
Joseph E. Fitzgerald, Sr., 1402 Westridge Road,
Richmond, Va.
Filed July 27, 1964, Ser. No. 385,229
16 Claims. (Cl. 56—25.4)

This invention relates to ground or floor working devices and the like, and more particularly to an attachment for a vehicle including working means adapted to be positioned about vertical members disposed laterally relative to the line of travel of the vehicle.

In the prior art there are numerous types of ground or flooring working devices which are adapted to be maneuvered over selected working areas. Most of such devices, however, have been found not to be entirely suitable for use in working areas provided with vertically disposed objects such as trees in orchards and lawn areas, wooden post members, such as fence posts and utility poles, and the like. There has been developed in the art certain types of devices which are adapted to position working elements around such vertically disposed objects, but such devices have not been found to be entirely satisfactory. Such devices usually either are complex in construction and therefore expensive to manufacture, or require considerable maneuvering by the operator of the device, so as to render them impractical for many uses.

Accordingly, the principal object of the present invention is to provide a novel ground or floor working device.

Another object of this invention is to provide a novel ground or floor working device which is adapted to be positioned about vertical objects.

A more specific object of this invention is to provide a novel attachment for a vehicle, including working means adapted to be positioned about vertical objects disposed laterally relative to the line of travel of the vehicle.

A further object of the present invention is to provide a novel attachement for a vehicle, including working means adapted to be positioned about vertical objects disposed laterally relative to the line of travel of the vehicle while the vehicle is moving.

A still further object of the present invention is to provide a novel attachement for a vehicle, including working means adapted to be positioned about vertical objects disposed in parallel rows while the vehicle is moving between the rows.

A still further object of the present invention is to provide a novel attachment for a vehicle, including working means adapted to be positioned about vertical objects disposed laterally relative to the line of travel of the vehicle, which is comparatively simple in construction and relatively inexpensive to manufacture.

Other objects and advantages of the present invention will become more apparent to those persons skilled in the art, from the following description when taken in conjunction with the accompanying drawings, wherein:

FIGURE 1 is a top plan view of an embodiment of the invention, having a portion thereof broken away;

FIGURE 2 is an enlarged view taken along line 2—2 in FIGURE 1;

FIGURE 3 is an enlarged cross-sectional view taken along line 3—3 in FIGURE 1;

FIGURE 4 is an enlarged cross-sectional view taken along line 4—4 in FIGURE 1;

FIGURE 5 is an enlarged fragmentary view of a portion of the embodiment illustrated in FIGURE 1;

FIGURE 6 illustrates the sequence of positions of an embodiment of the invention during operation; and FIGURE 7 is a front elevational view of a second embodiment of the invention.

Briefly described, the present invention provides an assembly for positioning working means around a vertical object disposed laterally relative to a line of travel of the assembly while the assembly is moving along the line of travel, generally comprising mobile support means and first and second working means operatively connected to the support means for movement along independent paths relative to the support means. Each of the working means is engageable with the other and also with the vertical object. Yieldable means is provided for maintaining the first working means in a preselected position. In addition, biasing means operatively interconnecting the working means are provided for urging the working means into mutual engagement. Means also are provided for driving the working means.

Referring to FIGURES 1 through 6 of the drawings, there is illustrated a first embodiment of the invention. Specifically, FIGURE 1 illustrates a conventional tractor 10, and a grass cutting attachment 11 mounted on the rearward end of the tractor. The tractor is provided with a pair of rearwardly extending mounting brackets 12 and 13, and a drive shaft 14 which is operatively connected to the rear power take-off shaft 15 of the tractor by means of a universal connection 16.

The attachment 11 comprises an elongated frame member 17, adapted to extend transversely relative to the centerline of the tractor when secured to the tractor, by means of a pair of spaced brackets 18 and 19. The brackets 18 and 19 are adapted to be secured to the mounting brackets 12 and 13 on the tractor by suitable bolts 20. As best illustrated in FIGURES 2, 3 and 4, the frame member 17 has a substantially rectangular cross-section including a top wall 21, side walls 22 and 23 and a bottom wall 24. The frame member also is supported by means of spaced wheel units 25 and 26, having stub shaft portions 27 and 28 received through vertical openings in rearwardly extending brackets 29 and 30. The brackets 29 and 30 are secured in place by means of suitable set screws 31.

Journaled in an end plate 32 mounted on the top wall 21 of the frame member and a collar member 33 mounted on the bottom wall of the frame member is a vertically disposed shaft 34. The axis of the shaft 34 is adapted to lie along the centerline of the vehicle so that a bevel gear 35 mounted on the bottom end of the shaft meshes with a bevel gear 36 mounted on the end of drive shaft 15, as best illustrated in FIGURE 4. Also mounted on the shaft 34 between the top and bottom walls of the frame member are drive pulleys 37 and 38. The drive pulley 37 is operatively connected to a pulley 39 mounted on a vertically disposed shaft 40 mounted adjacent one end of the frame member by means of a drive belt 41. Similarly, the drive pulley 38 is operatively connected to a pulley 42 mounted on a vertically disposed shaft 43 journaled at the opposite end of the frame member by means of a drive pulley 44.

The construction of the attachment at each end of the frame member is substantially the same. Therefore, the construction of one end hereinafter will be described and it will be understood that the construction of the opposite end is similar. As best illustrated in FIGURES 2 and 3, the shaft 43 extends above and below the top and bottom walls of the frame member. Pivotally connected to the upwardly extending portion of the shaft 43 is a forwardly and outwardly extending arm member 45. The free end of the arm member 45 is provided with a depending bearing housing 46, having vertically spaced bearings 47 and 48, in which there is journaled a vertically disposed shaft 49. The shaft 49 is provided with a bearing collar 50 which seats on the upper surface of the arm member 45 for supporting the shaft. Mounted on the lower end of the shaft 49 is a rotary cutter blade 51, which is provided with a cover member 52 having a top wall 53 supported on a collar portion 54 formed on the shaft 49, a circular depending skirt portion 55 and a bumper strip 56 disposed around the lower portion of the skirt portion 55. Drive is transmitted from the shaft 43 to the shaft 49 by means of a pulley 57 mounted on the upper end of shaft 43, a pulley 58 mounted on the upper end of the shaft 49 and an interconnecting drive belt 59.

Pivotally connected on the lower end of the shaft 43 is a forwardly and inwardly extending arm member 60, which preferably has the same length as the arm member 45. The arm member 60 has a vertically disposed shaft 61 journaled in the forward end thereof, having a rotary cutter blade 62, similar to the blade 51, mounted on the lower end thereof. The shaft 61 also is provided with a suitable collar portion similar to the collar portion 54 on shaft 49 for supporting a cover member 63 for the rotary cutter blade 62, including a top wall 64 lying in substantially the same horizontal plane as top wall 53 of cover member 52, a circular depending skirt portion 65 and a bumper strip portion 66 formed around the lower portion of the skirt portion 65 which is engageable with the bumper strip 56 on the cover member 52. It will be appreciated that the cover members 52 and 63 are adapted to move along independent arcuate paths lying in the same horizontal plane. Drive is transmitted from the shaft 43 to the shaft 61 by means of a pulley 67 mounted on the lower end of the shaft 43, a drive belt 68 and a pulley 69 mounted on the shaft 61 below the arm member 60.

The arm member 60 under normal conditions extends forwardly and inwardly, as illustrated in FIGURE 1, and is maintained in such position by means of a linking assembly 70. As shown in FIGURE 5, the linking assembly 70 comprises a fluid cylinder 71 pivotally connected at one end thereof to a bracket 72 mounted on the front wall 23 of the frame member, and a piston member 73 having a stem portion 74 extending through a suitable opening at the free end of the cylinder 71 and being pivotally connected to a lug 75 mounted on the arm member 60, and a head portion 76 formed with a restricted fluid passage means 77 communicating with each side of the head portion. The arm member 60 is yieldingly maintained in the position illustrated in FIGURES 1 and 5 by means of a helical spring 78 disposed within the cylinder 71 between an end wall 79 at the free end of the cylinder 71 and the head portion 76 of the piston member 73. The arm member 60 also is maintained in such position by means of a coil spring 80 mounted on the frame member, having the end portion thereof extending outwardly and engaging the outer edge of the arm member 60. It will be appreciated that when the arm member 60 is pivoted outwardly, the action of the helical spring 78 supplemented by the action of the spring 80, will cause the arm member to return to the preselected position, extending forwardly and inwardly. Interconnecting the arm members 45 and 60 is a spring 81 which acts to urge the arm members 45 and 60 towards each other, so that the bumper members 56 and 60 will be in engagement. Under such circumstances, the arm member 45 will be angularly displaced outwardly relative to the arm member 60. In addition, the biasing force of the spring member 81 is greater than the combined force of the springs 78 and 80, so that the arm members will be urged toward each other when they are caused to pivot, as a unit, about the shaft 43, against the combined force of the springs 78 and 80 acting on arm member 60.

During normal conditions, the arm members supporting the rotary cutting units are positioned as illustrated in FIGURE 1. When it is desired to cut the grass disposed around a vertical object, such as a tree trunk 82, as shown in FIGURE 1, the tractor 10 having the attachment 11 secured on the rearward end thereof, is maneuvered so that it travels along a line of travel having the tree trunk 52 disposed laterally thereof. The distance of the line of travel from the tree trunk 82 is adjusted so that the tree trunk 82 will first be engaged by the circular cover member 52. As soon as the cover member 52 engages the tree trunk 82, it is caused to pivot outwardly around the axis of shaft 43. The cover member 63 next is caused to engage the tree trunk. The tree trunk 82 thus is received between the cover members 52 and 63 which are urged into constant engagement with the tree by means of the interconnecting spring 81, as illustrated in the first sequence in FIGURE 6. As the tractor advances along its line of travel, the arm members 45 and 60 pivot as a unit against the action of springs 78 and 80 whereby the cover members 52 and 63 are caused to move around the tree, as illustrated in the second sequence in FIGURE 6. The pivotal movement of the arm members 45 and 60 cause the piston member 73 of the fluid cylinder 71 to be extended, thereby loading the spring 78. After the piston member 73 has been extended to its furthest extent, as illustrated in the third sequence in FIGURE 6, the cover member 52 continues to move around the tree being urged into engagement with the tree trunk by means of the spring member 81. Thus it will be seen that the cover members 52 and 63 are adapted to engage a tree trunk and be moved around the periphery thereof to position the rotary cutter blades 51 and 62 to cut the grass around the base of the tree trunk. As soon as the cover member 52 clears the tree trunk, the loaded spring 78 of the fluid cylinder expands, retracting the piston member, thereby returning the arm member 60 back to its preselected position, as illustrated in FIGURE 1. The fluid in the cylinder 71 will prevent the sudden return of the arm members by snubbing the movement of the piston member in the conventional manner. The force of the spring member 81 also will cause the arm member 45 to bring the cover member 52 into engagement with the cover member 63. As previously mentioned, it will be appreciated that the force of the spring member 81 is sufficient to urge the arm members 45 and 60 toward each other, to cause the cover members 52 and 63 to engage the tree trunk as the cover members move around the periphery thereof. The force of the spring member 81 is also greater than the force exterted on the arm member 60 by the spring member 78 of the fluid cylinder, so that the arm members 45 and 60 will pivot as a unit when the cover members 52 and 63 move around the base of the tree trunk.

As can be seen in FIGURE 1, the rotary cutter units can be mounted on either end of the frame member 17 to enable the attachment to be moved along two parallel rows of vertical objects such as would be provided in an orchard to cut the grass between successive trees, and around each of the trees. It also would be possible to make the length of the frame member 17 adjustable, so that the attachment could readily be used for different applications, wherein the spacing between parallel rows of vertical objects varies.

Referring to FIGURE 7 of the drawings, there is illustrated another embodiment of the invention. This embodiment provides a mobile vehicle 83, having a laterally extending support member 84. Pivotally connected to the end of the support member 84 is a pair of forwardly extending arm members 85 and 86 which are similar to the arm members 45 and 60 described in connection with the first mentioned embodiment. The embodiment illustrated in FIGURE 7 is substantially similar to the earlier mentioned embodiment, except that the working members comprise a pair of rotary brushes 87 and 88 operatively connected to the ends of the arm members 85 and 86, respectively. The brushes are adapted to engage a vertically disposed leg member 89, such as for a piece of furniture. The rotary brushes 87 and 88 can be driven by any suitable drive means, including a belt and pulley system, as described in connection with the first mentioned embodiment.

It further will be appreciated that any type of ground or floor working means can be utilized with the invention including, but not limited to, cutters, brushes, buffers, sanders, cultivators, harrowers, material dispensers and the like.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. An attachment for a vehicle including means adapted to be positioned about a vertical member disposed laterally relative to the line of travel of the vehicle comprising a frame member attachable to said vehicle and extending laterally relative to the centerline of the vehicle, a first arm member pivotally connected to said frame member for pivotal movement in a horizontal plane, a second arm member pivotally connected to said frame member for pivotal movement in a horizontal plane, working means mounted on the free ends of said arm members, a first housing means mounted on the working means of said first arm member, a second housing means mounted on the working means of said second arm member, said second housing means being disposed outwardly relative to said first housing means and engageable therewith, yieldable means maintaining said first arm member in a preselected position, extending forwardly and disposed angularly inwardly relative to the centerline of said vehicle, biasing means operatively interconnecting said arm members for urging said first and second housing means into engagement and means for transmitting drive from a power take-off of said vehicle to said working means.

2. An attachment for a vehicle including working means adapted to be positioned about a vertical member disposed laterally relative to the line of travel of the vehicle comprising a frame member attachable to said vehicle and extending laterally relative to the centerline of the vehicle, a first arm member pivotally connected to said frame member for pivotal movement in a horizontal plane, a second arm member pivotally connected to said frame member for pivotal movement in a horizontal plane, rotary working means mounted on the free ends of said arm members, a first circular cover means mounted on the rotary working means of said first arm member, a second circular cover means mounted on the rotary working means of said second arm member, said second circular cover means being disposed outwardly relative to said first cover means and engageable therewith, yieldable means maintaining said first arm member in a preselected position extending substantially forwardly and inwardly relative to the centerline of said vehicle, biasing means operatively interconnecting said arm members for urging said first and second cover means into engagement and means for transmitting drive from a power take-off of said vehicle to said working means.

3. An attachment for a vehicle including working means adapted to be positioned about a vertical member disposed laterally relative to the line of travel of the vehicle comprising a frame member attachable to said vehicle extending laterally relative to the centerline of the vehicle, first and second arm members pivotally connected to said frame member for pivotal movement in horizontal planes, rotary cutter means mounted on the free ends of said arm members, first and second cover means mounted over the rotary cutter means of said first and second arm members including circular depending skirt portions, the circular depending skirt portion of said second rotary cutter means being disposed outwardly relative to said first circular depending skirt portion of said first rotary cutter means and engageable therewith, yieldable means maintaining said first arm member in a preselected position extending substantially forwardly and inwardly relative to the centerline of said vehicle, biasing means operatively interconnecting said arm members for urging said first and second depending skirt portions into engagement and means for transmitting drive from a power take-off of said vehicle to said working means.

4. An attachment according to claim 3, wherein the yieldable means maintaining the first arm member in the preselected position comprises a cylinder member having one end thereof pivotally connected to said frame member, a plunger member having a head portion slidably mounted within the cylinder member and a stem portion extending through an opening in an end wall at the free end of the cylinder member with the free end thereof, pivotally connected to said first arm member and a spring member disposed within the cylinder between the lead portion of the plunger member and the end wall at the free end of the cylinder member.

5. An attachment according to claim 4, wherein the cylinder contains a fluid and the head portion of the plunger is provided with a restricted fluid passageway to snub the movement of the plunger relative to the cylinder.

6. An attachment according to claim 3, wherein there is provided a pulley and belt drive system for transmtting drive from the power take-off of the vehicle to the rotary cutter means.

7. An attachment according to claim 4, wherein there is provided a pulley and belt drive system for transmitting drive from the power take-off of the vehicle to the rotary cutter means.

8. An attachment for a vehicle including working means adapted to be positioned about vertical members in parallel rows disposed laterally to each side relative to the line of travel of the vehicle comprising a frame member attachable to said vehicle and extending transversely relative to the centerline of the vehicle, first and second arm members pivotally connected to each end of said frame member for pivotal movement in horizontal planes, at least one rotary cutting blade having a vertically disposed shaft journaled in the free end of each arm member, first and second cover means mounted over the rotary cutter blades of said first and second arm members including circular depending skirt portions, the circular depending skirt portion of said second arm member being disposed outwardly relative to said first circular depending skirt portion of said first arm member and engageable therewith, yieldable means maintaining said first arm member in a preselected position extending substantially forwardly and outwardly relative to the centerline of said vehicle comprising a cylinder member having one end thereof pivotally connected to said frame member, a plunger member having a head portion slidably mounted within said cylinder member and a stem portion extending through an opening in an end wall at the free end of the cylinder member with the free end thereof pivotally connected to said first arm member and a spring member disposed within the cylinder between the head portion of the plunger member and the end wall at the free end of the cylinder member, biasing means operatively interconnecting said first and second arm members for urging said first and second depending skirt portions into mutual engagement and a pulley and belt drive system for transmitting drive from a power take-off of the vehicle to the shafts of the rotary cutter blades.

9. An attachment according to claim 8, wherein the cylinder contains a fluid and the head portion of the plunger is provided with a restricted fluid passageway to snub the movement of the plunger relative to the cylinder.

10. An attachment for a vehicle including working means adapted to be positioned about a vertical member disposed laterally relative to the line of travel of the vehicle comprising a frame member attachable to said vehicle extending laterally relative to the centerline of the vehicle, first and second arm members pivotally connected to said frame member for pivotal movement in horizontal planes, said arm members having a common vertical pivot axis, rotary cutter means mounted on the free ends of said arm members, first and second cover means mounted over the rotary cutter means of said first and second arm members including circular depending skirt portions, the circular depending skirt portion of said second rotary cutter means being disposed outwardly relative to said first circular depending skirt portion of said first rotary cutter means and engageable therewith, yieldable means maintaining said first arm member in a preselected position extending substantially forwardly and inwardly relative to the centerline of said vehicle, biasing means operatively interconnecting said arm members for urging said first and second depending skirt portions into engagement and means for transmitting drive from a power take-off of said vehicle to said working means.

11. An attachment according to claim 10, wherein the yieldable means maintaining the first arm member in the preselected position comprises a cylinder member having one end thereof pivotally connected to said frame member, a plunger member having a head portion slidably mounted within the cylinder member and a stem portion extending through an opening in an end wall at the free end of the cylinder member with the free end thereof pivotally connected to said first arm member and a spring member disposed within the cylinder between the head portion of the plunger member and the end wall at the free end of the cylinder member.

12. An attachment according to claim 11, wherein the cylinder contains a fluid and the head portion of the plunger is provided with a restricted fluid passageway to snub the movement of the plunger relative to the cylinder.

13. An attachment according to claim 10, wherein there is provided a pulley and belt drive system for transmitting drive from the power take-off of the vehicle to the rotary cutter means.

14. An attachment according to claim 11, wherein there is provided a pulley and belt drive system for transmitting drive from the power take-off of the vehicle to the rotary cutter means.

15. An attachment for a vehicle including working means adapted to be positioned about vertical members in parallel rows disposed laterally to each side relative to the line of travel of the vehicle comprising a frame member attachable to said vehicle and extending transversely relative to the centerline of the vehicle, first and second arm members pivotally connected to each end of said frame member for pivotal movement in horizontal planes, each pair of said arm members having a common vertical pivot axis, at least one rotary cutting blade having a vertically disposed shaft journaled in the free end of each arm member, first and second cover means mounted over the rotary cutter blades of said first and second arm members including circular depending skirt portions, the circular depending skirt portion of said second arm member being disposed outwardly relative to said first circular depending skirt portion of said first arm member and engageable therewith, yieldable means maintaining said first arm member in a preselected position extending substantially forwardly and inwardly relative to the centerline of said vehicle comprising a cylinder member having one end thereof pivotally connected to said frame member, a plunger member having a head portion slidably mounted within said cylinder member and a stem portion extending through an opening in an end wall at the free end of the cylinder member with the free end thereof pivotally connected to said first arm member and a spring member disposed within the cylinder between the head portion of the plunger member and the end wall at the free end of the cylinder member, biasing means operatively interconnecting said first and second arm members for urging said first and second depending skirt portions into mutual engagement and a pulley and belt drive system for transmitting drive from a power take-off of the vehicle to the shafts of the rotary cutter blades.

16. An attachment according to claim 15, wherein the cylinder contains a fluid and the head portion of the plunger is provided with a restricted fluid passageway to snub the movement of the plunger relative to the cylinder.

References Cited by the Examiner

UNITED STATES PATENTS

| | | | |
|---|---|---|---|
| 517,588 | 4/1894 | Rehm | 146—28 |
| 2,410,918 | 11/1946 | Acton | 172—316 |
| 3,045,413 | 7/1962 | Sheffer | 56—6 X |
| 3,057,413 | 10/1962 | Procter | 172—59 X |
| 3,059,704 | 10/1962 | Kasatkin | 172—59 X |
| 3,115,739 | 12/1963 | Thoen et al. | 56—6 |

ANTONIO F. GUIDA, *Acting Primary Examiner.*

RUSSEL R. KINSEY, ABRAHAM G. STONE,
*Examiners.*

M. C. PAYDEN, *Assistant Examiner.*